(12) United States Patent
Francois

(10) Patent No.: US 11,530,782 B2
(45) Date of Patent: Dec. 20, 2022

(54) DEVICE AND METHOD FOR FILLING TANKS WITH PRESSURIZED GAS

(71) Applicant: L'Air Liquide, Societe Anonyme pour l'Etude et l'Exploitation des Procedes Georges Claude, Paris (FR)

(72) Inventor: Thibaut Francois, Sassenage (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 409 days.

(21) Appl. No.: 16/738,605

(22) Filed: Jan. 9, 2020

(65) Prior Publication Data

US 2020/0217456 A1   Jul. 9, 2020

(30) Foreign Application Priority Data

Jan. 9, 2019   (FR) ...................................... 1900192

(51) Int. Cl.
  *F17C 13/04*   (2006.01)
  *F17C 1/00*   (2006.01)
  (Continued)

(52) U.S. Cl.
  CPC ............ *F17C 13/045* (2013.01); *F17C 1/005* (2013.01); *F17C 5/06* (2013.01);
  (Continued)

(58) Field of Classification Search
  CPC .......... F17C 5/06; F17C 1/005; F17C 13/045; F17C 2227/042; B60K 15/03006; B60K 2015/03315
  See application file for complete search history.

(56) References Cited

U.S. PATENT DOCUMENTS 5,673,735 A * 10/1997 Crvelin ................. F17C 13/045
                                                           141/54
8,091,593 B2     1/2012 Allidieres
(Continued)

FOREIGN PATENT DOCUMENTS

FR      2 891 347       3/2007
FR      3 033 866       9/2016
FR      3 067 094      12/2018

OTHER PUBLICATIONS

French Search Report and Written Opinion for FR 1 900 192, dated Oct. 9, 2019.

*Primary Examiner* — Timothy P. Kelly
(74) *Attorney, Agent, or Firm* — Christopher J. Cronin

(57) ABSTRACT

Device for filling tanks with pressurized gas, in particular hydrogen gas tanks of motor vehicles, the device comprising at least one gas source, a transfer circuit comprising at least one upstream end connected to the source and at least one downstream end intended to be connected in removable fashion to a tank to be filled, the transfer circuit additionally comprising, between its upstream and downstream ends, a set of buffer storage container(s) which is (are) connected in parallel to the transfer circuit via a set of respective connecting valve(s), the transfer circuit comprising a portion of pipe(s) forming a loop, a plurality of the buffer storage container(s) being connected in parallel to the said loop, characterized in that the transfer circuit comprises a plurality of separate downstream ends each intended to be connected in removable fashion to a respective tank to be filled, the said downstream ends being connected in parallel to the said loop and comprising a set of respective linking valves, so that control of the connecting valves and of the linking valves makes it possible to bring at least one first buffer storage container into fluidic communication, via the loop, with a first downstream end and, simultaneously, to bring at least (Continued)

one second buffer storage container into fluidic communication, via the loop, with a second downstream end and/or to bring two separate buffer storage containers into fluidic communication.

17 Claims, 2 Drawing Sheets

(51) Int. Cl.
 *F17C 5/06* (2006.01)
 *B60K 15/03* (2006.01)
(52) U.S. Cl.
 CPC .............. *B60K 15/03006* (2013.01); *B60K 2015/03315* (2013.01); *F17C 2227/042* (2013.01)

(56) References Cited

U.S. PATENT DOCUMENTS

| | | |
|---|---|---|
| 2014/0352840 A1 | 12/2014 | Blanchet |
| 2017/0102110 A1 | 4/2017 | Lomax et al. |
| 2017/0336028 A1 | 11/2017 | Cohen et al. |
| 2018/0073679 A1 | 3/2018 | Roberge et al. |
| 2018/0347761 A1 | 12/2018 | Lacombe et al. |

\* cited by examiner

DEVICE AND METHOD FOR FILLING TANKS WITH PRESSURIZED GAS

CROSS-REFERENCE TO RELATED APPLICATIONS

This application claims the benefit of priority under 35 U.S.C. § 119 (a) and (b) to French patent application No. FR 1900192, filed Jan. 9, 2019, the entire contents of which are incorporated herein by reference.

BACKGROUND

Field of the Invention

The invention relates to a device and method for filling tanks with pressurized gas.

The invention more particularly relates to a device for filling tanks with pressurized gas, in particular hydrogen gas tanks of motor vehicles, the device comprising at least one gas source, a transfer circuit comprising at least one upstream end connected to the source and at least one downstream end intended to be connected in removable fashion to a tank to be filled, the transfer circuit additionally comprising, between its upstream and downstream ends, a set of buffer storage container(s) which is (are) connected in parallel to the transfer circuit via a set of respective connecting valve(s), the transfer circuit comprising a portion of pipe(s) forming a loop, a plurality of the buffer storage container(s) being connected in parallel to the said loop.

Related Art

It is known to fill tanks with pressurized gas by equilibrating or cascade (with one or more buffer storage containers) and/or by direct or indirect compression (cf., for example, JP20031742497 or FR 2 891 347 A).

In the majority of known devices, the filling of the buffer storage containers used for the filling is only possible after the tank has been filled.

Furthermore, known devices make possible the simultaneous filling of several tanks but for tanks having the same initial pressure conditions. The simultaneous filling of several tanks having different initial pressure conditions is only possible at the cost of a bulky and expensive installation (dedicated pressure sources for each filling line).

SUMMARY OF THE INVENTION

One aim of the present invention is to overcome all or some of the disadvantages of the prior art which are noted above.

To this end, the device according to the invention, moreover in accordance with the generic definition which the above preamble gives for it, is essentially characterized in that the transfer circuit comprises a plurality of separate downstream ends each intended to be connected in removable fashion to a respective tank to be filled, the said downstream ends being connected in parallel to the said loop and comprising a set of respective linking valve(s), so that control of the connecting valves and of the linking valves makes it possible to bring at least one first buffer storage container into fluidic communication, via the loop, with a first downstream end and, simultaneously, to bring at least one second buffer storage container into fluidic communication, via the loop, with a second downstream end and/or to bring two separate buffer storage containers into fluidic communication.

Moreover, embodiments of the invention can comprise one or more of the following characteristics:
  the loop of the transfer circuit comprises a set of isolation valves configured, according to their closing/opening state, to block or allow the circulation of the fluid in the loop to or from a buffer storage container by controlling the direction of circulation in the loop,
  the set of isolation valves comprises, for each buffer storage container, two valves respectively positioned on either side of the link of the buffer storage container with the loop,
  the loop comprises at least one valve located between two adjacent connections of downstream ends to the loop,
  the transfer circuit comprises at least one compressor comprising an inlet for gas to be compressed connected to at least one among: the source, at least one buffer storage container, and a compressed gas outlet connected to at least one from: at least one buffer storage container, at least one of the plurality of downstream ends of the circuit,
  the device comprises at least one compressor positioned in series in the circuit between the source and the loop, that is to say that the inlet of the compressor is connected to the source and the outlet of the compressor is connected to the loop in order to make it possible to feed with compressed gas all or some of the buffer storage containers and/or of the downstream ends of the circuit via the loop,
  the device comprises at least one compressor positioned in the circuit, the inlet of the compressor being connected to a portion of the loop and the outlet of the compressor being connected to another portion of the loop, in order to make it possible to feed the inlet of the compressor with fluid originating from the source and/or from at so least one buffer storage container and in order to make it possible to feed with gas compressed by the compressor all or some of the other buffer storage containers and/or of the downstream ends of the circuit via the loop,
  the device comprises two compressors positioned in parallel or in series in the transfer circuit.

The invention also relates to a method for filling tanks with pressurized gas, in particular hydrogen gas tanks of motor vehicles, using a device according to any one of the characteristics above or below, the method comprising a stage of transfer of pressurized gas into a first tank connected to a first downstream end of the transfer circuit via a first portion of the loop.

According to other possible distinctive features:
  the method comprises, simultaneously with the stage of transfer of pressurized gas into the first tank, a stage of transfer of pressurized gas into a second tank connected to a second downstream end of the transfer circuit via a second portion of the loop,
  during the stage of transfer of pressurized gas into the second tank, the pressurized gas is provided by at least one buffer storage container, in particular several buffer storage containers used successively in cascade, and/or by a compressor,
  the method comprises, simultaneously with the stage of transfer of pressurized gas into the first tank, a stage of transfer of pressurized gas into at least one buffer storage container via another portion of the loop, during the stage of transfer of pressurized gas into at least one buffer storage container, the pressurized gas is provided by at least one buffer storage container, in particular several buffer storage containers used successively in cascade, and/or by a compressor, during the stage of transfer of pressurized gas into the first tank, the pressurized gas is provided by at least one buffer storage container, in particular several buffer storage containers used successively in cascade, and/or by a compressor.

The invention can also relate to any alternative device or method comprising any combination of the characteristics above or below within the scope of the claims.

BRIEF DESCRIPTION OF THE FIGURES

Other distinctive features and advantages will become apparent on reading the description below, made with reference to the figures, in which.

DETAILED DESCRIPTION OF THE INVENTION

Figure 1:
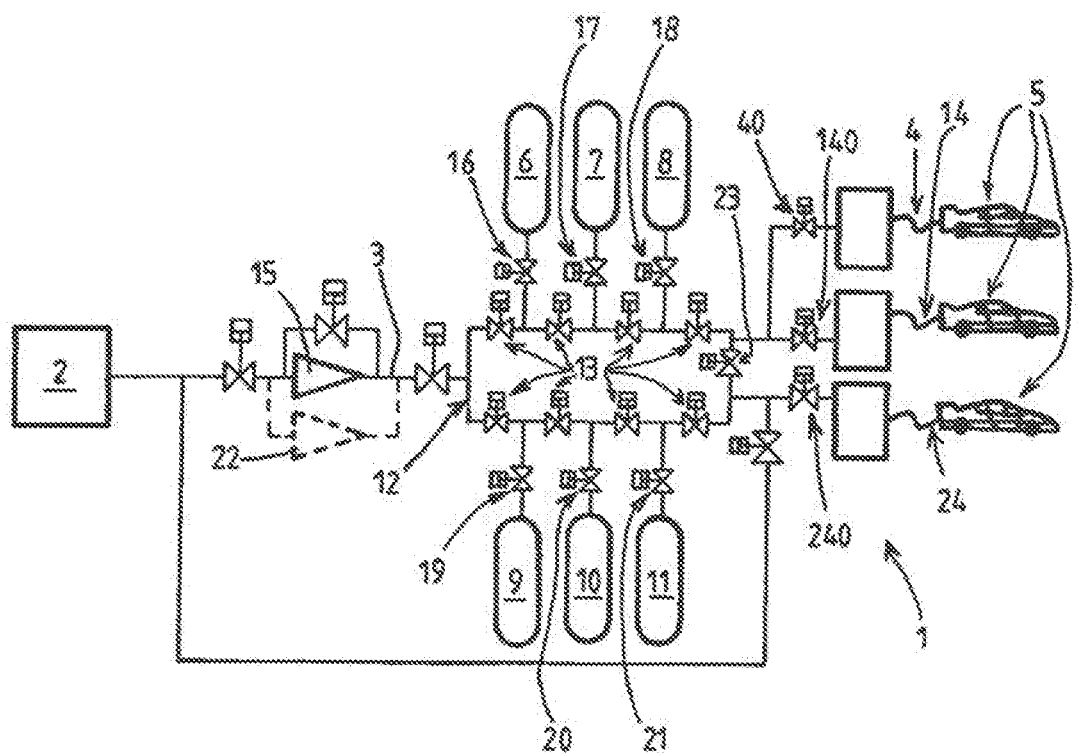
FIG. 1 represents a diagrammatic and partial view illustrating the structure and the operation of a first implementational example of a device according to the invention.

The device 1 for filling tanks with pressurized gas (service station, for example) represented in [FIG. 1] comprises a gas source 2, a transfer circuit 3 comprising at least one upstream end connected to the source 2 and several downstream ends 4, 14, 24 intended to be connected in removable fashion to respective tanks 5 to be filled.

The source 2 can comprise one or more tanks for pressurized gas and/or one or more storage containers for liquefied gas (associated or not with a vaporization system), one or more electrolysers and/or any other appropriate source of pressurized gas.

The transfer circuit 3 comprises, between its upstream and downstream ends, a portion of pipe(s) forming a loop 12, that is to say that the loop 12 is formed of one or more sections of pipes making possible circulation of the pressurized gas in one direction (or in the opposite direction) between two elements connected to separate points of the loop 12. For example, theoretically, the gas can pass through the loop and return to the starting point by circulating in one direction or in the opposite direction.

The circuit 3 comprises a set of buffer storage container(s) 6 to 11 connected in parallel to the transfer circuit (3) via a set of respective connecting valve(s) 16 to 21. More specifically, the buffer storage container(s) 6 to 11 are connected in parallel to said loop 12, that is to say that each of the buffer storage containers (six in this example) can be connected in fluidic fashion to the other buffer storage tanks via the loop 12 (with a gas flow in one direction or in the other in the loop 12).

Likewise, the downstream ends 4, 14, 24 (three in this example) of the circuit 3 are connected in parallel to the said loop 12. Preferably, each of the downstream ends comprises a respective linking valve 40, 140, 240.

Thus, control of the connecting valves 16 to 21 and of the linking valves 40, 140, 240 makes it possible, via the loop 12, to bring each buffer storage container into fluidic communication (or not) with each of the first downstream ends 4, 14, 24. Likewise, this same control of the valves makes it possible to bring at least one first buffer storage container into fluidic communication, via the loop (12), with a first downstream end and, simultaneously, to bring at least one second buffer storage container into fluidic communication, via the loop (12), with a second downstream end and/or to bring two separate buffer storage containers into fluidic communication, that is to say that this architecture makes it possible to fill several tanks 5 at the same time from different respective buffer storage containers. Likewise, this makes possible if appropriate simultaneously the filling of one or more buffer storage containers.

The loop 12 of the transfer circuit 3 thus preferably comprises a set of isolation valves 13 configured, according to their closing/opening state, to block or allow the circulation of the fluid in the loop 12 to or from a buffer storage container by controlling the direction of circulation in the loop 12.

For example, the set of isolation valves 13 comprises, for each buffer storage container, two valves 13 respectively positioned on either side of the link of the buffer storage container with the loop 12. Thus, by closing these two valves 13, the access to the buffer storage container is closed. In the case of opening of one of the two valves, the circulation of fluid is possible between the loop 12 and the buffer storage container on the side of the open valve without affecting the adjacent buffer storage container located after the other valve, which is closed.

Likewise, as illustrated in [FIG. 1], the loop 12 preferably comprises a valve 23 located between two adjacent connections of downstream ends 4, 14, 24 to the loop 12. In the closed position, this valve 23 makes it possible to feed the downstream end(s) 4, 14, 24 located on one side of this valve (via a portion of the loop with circulation of the gas in a first direction of circulation) and, simultaneously, to feed the downstream end(s) 4, 14, 24 located on the other side of this valve 23 (via another portion of the loop 12 with circulation of the gas in an opposite direction to the first direction of circulation).

The circuit 3 can advantageously comprise at least one compressor 15 positioned in series between the source 2 and the loop 12. As seen in [FIG. 1], the circuit can in particular comprise a set of two compressors 15, 22 (or more) fitted in parallel between the source 2 and the loop 12.

The compressors 15 thus comprise an inlet for gas to be compressed connected to the source 2 and an outlet for compressed gas connected to the loop 12 (and thus to the buffer storage containers and to the downstream ends 4, 14, 24 of the circuit).

Thus, by controlling the opening of the appropriate valves, it is possible to fill one or more buffer storage containers and/or to feed one or more downstream ends 4, 14, 24 with the compressor 15 while, for example, other buffer storage containers are used to fill other tank(s) 5.

Figure 2:
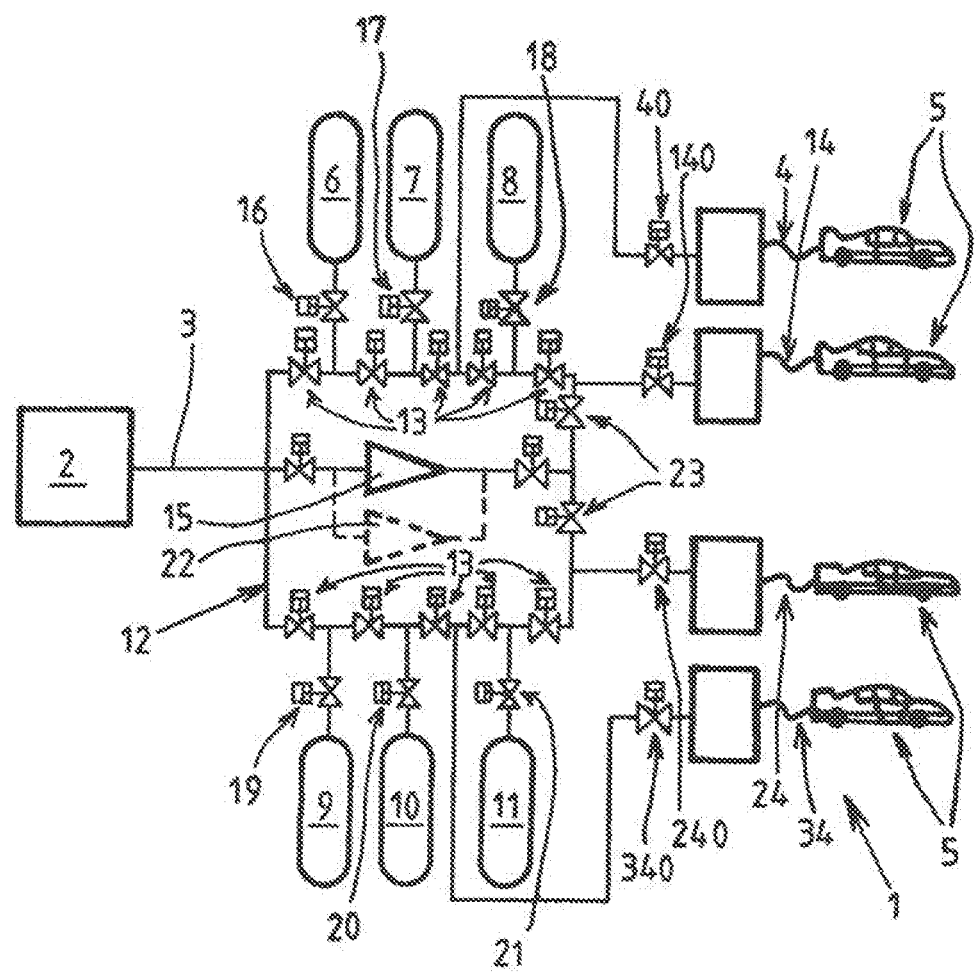
FIG. 2 represents a diagrammatic and partial view illustrating the structure and the operation of a second implementational example of a device according to the invention.

The embodiment of [FIG. 2] differs from that of [FIG. 1] essentially in that the compressor(s) 15, 22 are positioned "in the middle" of the loop 12, that is to say that the inlet of the compressor 15, 22 is connected to a portion of the loop 12 and the outlet of the compressor 15, 22 is connected to another portion of the loop 12. This configuration makes it possible, on the one hand, to feed the inlet of the compressor 15, 22 with fluid originating from the source 2 and/or from any of the buffer storage containers and, on the other hand, to feed with compressed gas, via the compressor 15, 22, all or part of the other buffer storage containers and/or of the downstream ends 4, 14, 24, 34 of the circuit.

The device according to the invention thus makes it possible to feed with pressurized gas one or more tanks 5 with any buffer storage container(s) (for example with the buffer storage containers having the highest pressure) and, at the same time, to (re)fill the buffer storage containers (via, for example, the compressor 15).

Thus, one, two or three buffer storage containers 6, 7, 8 can be used for the filling of a first tank 5 while, during this time, one, two or all the other buffer storage containers 9, 10, 11 are filled by the compressor 15. Likewise, simultaneously, two or more tanks 5 can be filled respectively by two respective sets of buffer storage container(s) while, at the same time, a third set of buffer storage container(s) is filled by the compressor 15.

Thus, although simple in structure and inexpensive, the device makes it possible to carry out several simultaneous cascades/fillings of several tanks 5.

This makes it possible to optimize the filling and repressurization times of the installation.

This solution also makes it possible to reduce the number of buffer storage containers necessary per flexible filling hose (downstream end 4, 14, 24).

This is because, instead of using, for example, three buffer storage containers (400 litres and 900 bar) for each downstream end 4, 14, 24 (dispenser), six of these buffer storage containers might be sufficient to feed three downstream ends 4, 14, 24 (that is to say, three flexible filling hoses for tanks 5).

This flexible modular sharing makes possible a reduction in the costs of the order of 50%.

This solution also makes possible an optimization of the electricity consumption of the compressor 15 as the latter can use high-pressure sources (buffer storage containers, case of [FIG. 2]), which reduces its electricity consumption and increases its output.

Thus, the installation is more often available for filling operations as the time necessary for the filling of the buffer storage containers between two uses is reduced.

All or part of the elements (valves, compressor, and the like) can be controlled and directed by an electronic control unit for the storage and processing of data comprising, for example, a microprocessor and in particular a computer. Conventionally, the flow and/or the pressure of the gas transferred into the tanks 5 can in particular be controlled in order to follow a (pre)determined rise in pressure/temperature/density or other.

As illustrated, the loop can be devoid of compressor.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising."

"Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for filling tanks with pressurized gas, the device comprising:
   at least one gas source; and
   a transfer circuit comprising:
      at least one upstream end connected to the at least one source; and
      a plurality of downstream ends, each end configured to be connected to a respective tank to be filled;
      a set of respective connecting valves;
      a portion of pipe(s) forming a loop and
      a plurality of buffer storage containers, each of the plurality of buffer storage containers are connected in parallel to the loop via respective one of the connecting valves of the set of respective connecting valves;
      wherein the set of respective connecting valves, portion of pipe(s) forming the loop, and the plurality of buffer storage containers are between the upstream end the plurality of downstream ends;
      wherein said plurality of downstream ends are connected in parallel to said loop and comprising a set of respective linking valves and
      wherein via control of the set of connecting valves and the set of respective linking valves, at least one first buffer storage container of the plurality of buffer storage containers is brought into fluidic communication, via the loop, with a first downstream end of the plurality of downstream ends and, simultaneously, at least one second buffer storage container of the plurality of buffer storage containers is brought into fluidic communication, via the loop, with a second downstream end of the plurality of downstream ends and/or two separate buffer storage containers of the plurality of buffer storage containers are brought into fluidic communication.

2. The device of claim 1, wherein the loop of the transfer circuit comprises a set of isolation valves configured, according to closing/opening state thereof, to block or allow a circulation of the fluid in the loop to or from one of the plurality of buffer storage containers by controlling a direction of the circulation in the loop.

3. The device of claim 2, wherein the set of isolation valves comprises, for each of the buffer storage containers of the plurality of buffer storage containers, two valves respectively positioned on either side of a link of the respective buffer storage container with the loop.

4. The device of claim 1, wherein the loop comprises at least one valve located between two adjacent connections of two respective downstream ends of the plurality of downstream ends to the loop.

5. The device of claim 1, wherein:
the transfer circuit further comprises at least one compressor each comprising a compressor gas inlet for gas to be compressed and a compressor gas outlet;
the compressor gas inlet is connected to the at least one source and/or at least one buffer storage container of the plurality of buffer storage containers; and
the compressor gas outlet is connected to at least one buffer storage container of the plurality of buffer storage containers and/or at least one of the downstream ends of the plurality of downstream ends.

6. The device of claim 5, wherein:
for each of the at least one compressor, the respective compressor gas inlet is connected to the source; and
for each of the at least one compressor, the respective compressor gas outlet is connected to the loop in order to make it possible to feed all or some of the buffer storage containers of the plurality of buffer storage containers with compressed gas and/or to feed the downstream ends of the plurality of downstream ends via the loop.

7. The device of claim 5, wherein:
for each of the at least one compressor, the respective compressor gas inlet is connected to a portion of the loop; and
for each of the at least one compressor, the respective compressor outlet is connected to another portion of the loop, in order to make it possible to feed the respective compressor gas inlet with fluid originating from the source and/or from at least one buffer storage container of the plurality of buffer storage containers and in order to make it possible to feed all or some of any other of the buffer storage containers of the plurality of buffer storage containers and/or to feed the downstream ends of the plurality of downstream ends via the loop.

8. The device of claim 5, said at least one compressor comprises two compressors, said two compressors being positioned in parallel or in series in the transfer circuit.

9. Method for filling tanks with pressurized gas, using the device of claim 1, the method comprising the steps of:
providing the device of claim 1; and
transferring pressurized gas into a first tank connected to a first downstream end of the plurality of downstream ends via a first portion of the loop.

10. The method of claim 9, further comprising a step of transferring pressurized gas into a second tank connected to a second downstream end of the transfer circuit via a second portion of the loop, said step of transferring pressurized gas into a second tank being performed simultaneously with said step of transferring pressurized gas into a first tank.

11. The method of claim 10, wherein, during said step of transferring pressurized gas into the second tank, the pressurized gas being transferred is provided by several of the buffer storage containers of the plurality of buffer storage container, successively in cascade.

12. The method of claim 9, further comprising the step of transferring pressurized gas into at least one buffer storage container of the plurality of buffer storage containers via another portion of the loop, said step of transferring pressurized gas into at least one buffer storage container being performed simultaneously with said step of transferring pressurized gas into a first tank.

13. The method of claim 12, wherein, during said step of transferring pressurized gas into at least one buffer storage tank, the pressurized gas being transferred is provided by several buffer storage containers of the plurality of buffer storage containers used successively in cascade.

14. The method of claim 9, wherein, during said step of transferring pressurized gas into the first tank, the pressurized gas being transferred is provided by several buffer storage containers of the plurality of buffer storage containers used successively in cascade.

15. The method of claim 10, wherein, during said step of transferring pressurized gas into the second tank, the pressurized gas being transferred is provided by a compressor.

16. The method of claim 12, wherein, during said step of transferring pressurized gas into at least one buffer storage tank, the pressurized gas being transferred is provided by a compressor.

17. The method of claim 9, wherein, during said step of transferring pressurized gas into the first tank, the pressurized gas being transferred is provided by a compressor.

* * * * *